Patented June 7, 1949

2,472,109

UNITED STATES PATENT OFFICE 2,472,109

METALLIZABLE MONOAZO DIPYRAZOLONES

Peter Hindermann, Basel, Switzerland, assignor to J. R. Geigy A. G., Basel, Switzerland No Drawing. Application December 31, 1946, Serial No. 719,635. In Switzerland December 27, 1945

Section 1, Public Law 690, August 8, 1946
Patent expires December 27, 1965

12 Claims. (Cl. 260—162)

It has been found that valuable metallisable monoazo dyestuffs of the pyrazolone series can be obtained, which surprisingly are characterised by a good affinity for cellulosic fibres, if molar quantities of the nitrated diazo compound of 1-amino-2-hydroxynaphthalene-4-sulfonic acid, i. e. 1-diazo-6-nitro-2-hydroxynaphthalene-4-sulfonic acid, are combined in a slightly acid, neutral or slightly alkaline medium with molar quantities of a dipyrazolone of the general formula

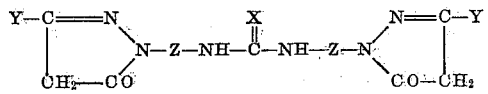

wherein $X$ stands for an oxygen or sulfur atom,
$Y$ stands for a methyl, ethyl or phenyl group and
$Z$ stands for a member selected from the group consisting of radicals of the benzene series bound in 1:4-position and of radicals of the diphenyl series bound in 4:4'-position.

The new dyestuffs form red-brown to dark powders. When subjected to a treatment with metal-yielding agents either in substance or on the fibre according to usual methods, the new dyestuffs can be transformed into metal complex compounds. The copper complex compounds are particularly valuable because of their excellent light-fastness. The coppering can be effected, as is known, for instance with copper sulfate in a neutral or slightly acetic acid bath or also in the presence of alkali tartrates in a slightly alkaline bath. In this way, orange-red or red dyeings will be produced, which are fast to light and alkalis and which often surprisingly possess also good fastness properties in the moist state.

The monoazo dyestuffs selected from the series of 1-(4'-aminophenyl)-3-methyl-5-pyrazolone-urea are particularly preferred in view of their easy availability and of their improved affinity for cellulosic fibres. The monoazo dyestuffs from 1-phenyl-(4'-phenyl-4''-amino)-3-methyl-5-pyrazolone-urea compounds are distinguished by a particularly good water-fastness of the dyeings produced on cellulosic fibres and subjected to an after-treatment with copper salts.

When compared with the known disazo dyestuffs produced from the same dipyrazolone derivatives, it is a surprising fact that the new dyestuffs show a good affinity for cellulosic fibres, whereas it is known to anybody skilled in the art that generally the loss of the conjugated system of an azo group causes a conversion of a disazo dyestuff into a monoazo dyestuff having a substantially inferior affinity for cellulosic fibres.

The same valuable, metallisable monoazo dyestuffs are also obtained by condensation of monazo dyestuffs from 1-diazo-6-nitro-2-hydroxynaphthalene-4-sulfonic acid and from 1-(4'-aminophenyl)-5-pyrazolone derivative or 1-phenyl-(4'-phenyl-4''-amino)-5-pyrazolone derivative with a further mole of such a 1-(4'-aminophenyl)-5-pyrazolone derivative or 1-phenyl-(4'-phenyl-4''-amino)-5-pyrazolone derivative respectively, in a known manner with phosgene, thiophosgene or carbon disulfide, until no more primary amino groups are present.

The following examples will illustrate the present invention without limiting it. The parts are by weight, unless otherwise stated, while the temperatures are designated in degrees Centigrade.

EXAMPLE 1

29.5 parts of 1-diazo-6-nitro-2-hydroxynaphthalene-4-sulfonic acid are combined to the monoazo dyestuff by adding 40.4 parts of urea of 1-(4'-aminophenyl)-3-methyl-5-pyrazolone in the presence of an excess of sodium carbonate. Upon stirring the mixture for some hours while cooling with ice, the diazo compound disapppears. The dyestuff is isolated by addition of sodium chloride and dried. The resulting dyestuff is a dark powder soluble in water with a red coloration and in concentrated sulfuric acid with an orange coloration. It dyes cellulosic fibres in brown-orange shades, which, on after-treatment with copper salts, are changed to red and possess substantially improved fastness properties to light and in the moist state.

The same dyestuff can also be obtained by coupling 29.5 parts of 1-diazo-6-nitro-2-hydroxynaphthalene-4-sulfonic acid with 18.9 parts of 1-(4'-aminophenyl)-3-methyl-5-pyrazolone in a soda alkaline solution and condensing the resultant aminomonoazo dyestuff with 18.9 parts of 1-(4'-aminophenyl)-3-methyl-5-pyrazolone in a soda alkaline solution with phogene, until no more free amino groups are present. The so-obtained dyestuff possess the same properties as the above described one.

The urea of 1-(4'-aminophenyl)-3-methyl-5-pyrazolone mentioned in the above example can be prepared in a known manner by condensing 37.8 parts of 1-(4'-aminophenyl)-3-methyl-5-pyrazolone in a soda-alkaline solution with phosgene, until any free amino groups have disappeared. The urea is a colorless powder.

EXAMPLE 2

29.5 parts of 1-diazo-6-nitro-2-hydroxynaphthalene-4-sulfonic acid are combined in the presence of an excess of sodium carbonate with 42 parts of thiourea of 1-(4'-aminophenyl)-3-methyl-5-pyrazolone, thus giving the monoazo dyestuff. Upon stirring this mixture while cooling with ice, the diazo compound disappears. The dyestuff is isolated by addition of sodium chloride, filtered and dried. The new dyestuff constitutes a dark powder which is soluble in water with an orangeish-red coloration and in concentrated sulfuric acid with an orange coloration and dyes cellulosic fibres in brown-orange shades. By an after-treatment with copper sulfate the color changes to red, while the fastness properties in the moist state and to light are substantially improved.

The thiourea of 1-(4'-aminophenyl)-3-methyl-5-pyrazolone is obtainable by treating 37.8 parts of 1-(4'-aminophenyl)-3-methyl-5-pyrazolone in a soda-alkaline solution with thiophosgene, until no more free amino groups can be traced, or by condensing 1-(4'-aminophenyl) - 3 - methyl- 5 - pyrazolone with carbon disulfide in the presence of small quantities of hydrogen peroxide, until no more free amino groups can be detected.

The preparation of 1-(4'-aminophenyl)-5-pyrazolone may be illustrated by means of the following example: By condensing 19.2 parts of benzoyl-acetic-acid-ethyl ester in boiling alcohol with 15.3 parts of p-nitrophenyl hydrazine, the 1-(4'-nitrophenyl)-3-phenyl-5-pyrazolone is obtained in good yield. Yellow needles of the melting point of 201–202° C. are thus obtained. By reduction with iron the corresponding 1-(4'-aminophenyl)-3-phenyl - 5 - pyrazolone is produced which can be isolated in form of the colorless crystalline hydrochloride.

On interaction of other acyl-acetic esters or substituted p-nitrophenyl hydrazines with each other in equivalent quantities the corresponding 1-(4'-nitrophenyl)-5-pyrazolones or 1-(4'-aminophenyl)-5-pyrazolones respectively will be obtained, which with respect to their properties are very similar to the above described 1-(4'-aminophenyl)-3-phenyl-5-pyrazolone.

EXAMPLE 3

29.5 parts of 1-diazo-6-nitro-2-hydroxynaphthalene-4-sulfonic acid are combined with an aqueous solution of 55.6 parts of urea of 1-phenyl-(4'-phenyl-4''-amino)-3-methyl-5-pyrazolone in the presence of an excess of sodium carbonate and while cooling with ice. After stirring for several hours at 0–10° C. the diazo compound disappears. The dyestuff is isolated by addition of sodium chloride. The dried dyestuff is a dark powder which dissolves in water with a red coloration and in concentrated sulfuric acid with an orange coloration. It dyes cellulosic fibres in brown-orange shades which, when after-treated with copper salts according to usual methods, are converted into orangeish-red shades of considerably improved fastness properties to light and in the moist state.

The urea of 1-phenyl-(4'-phenyl-4''-amino)-3-methyl-5-pyrazolone can be obtained by introducing phosgene into a solution of 53 parts of the above said aminopyrazolone in 500 parts of water in the presence of an excess of sodium carbonate and at room temperature, until no more free amino groups can be detected.

The corresponding thiourea can be produced under the same conditions by introducing thiophosgene until disappearance of the primary amino groups. The soda-alkaline solution of the 1-phenyl-(4'-phenyl-4''-amino)-3-methyl-5-pyrazolone can also be condensed according to the known method with carbon disulfide and hydrogen peroxide in order to produce the thiourea.

The monoazo dyestuff prepared under the above mentioned conditions from 29.5 parts of 1-diazo-6-nitro-2-hydroxynaphthalene - 4 - sulfonic acid and 57.2 parts of the thiourea of phenyl-(4'-phenyl-4''-amino)-3-methyl-5 - pyrazolone has very similar properties as the above described dyestuff.

The following table sets forth additional examples of dyestuffs obtainable according to the present invention, the process of their preparation being essentially analogous to the process described in the preceding examples.

Table

| No. | Diazo-compound | Dipyrazolone according to formula I | Shade of the coppered dyeing onto cellulosic fibres |
|---|---|---|---|
| 1 | 1-diazo-6-nitro-2-hydroxynapthalene-4-sulfonic acid | urea of 1-(4'-aminophenyl)-3-phenyl-5-pyrazolone | red. |
| 2 | ----do---- | urea of 1-(4'-amino-phenyl)-3-ethyl-5-pyrazolone | red. |
| 3 | ----do---- | urea of 1-(4'-amino-2'-chlorophenyl)-3-methyl-5-pyrazolone | red. |
| 4 | ----do---- | urea of 1-(4'-amino-2'-methylphenyl)-3-methyl-5-pyrazolone | red. |
| 5 | ----do---- | urea of 1-(4'-amino-2'-methylphenyl)-3-methyl-5-pyrazolone | red. |
| 6 | ----do---- | urea of 1-(4'-amino-3'-chlorophenyl)-3-methyl-5-pyrazolone | red. |
| 7 | ----do---- | urea of 1-(4'-amino-2'-methoxyphenyl)-3-methyl-5-pyrazolone | red. |
| 8 | ----do---- | urea of 1-(4'-amino-2'-bromophenyl)-3-methyl-5-pyrazolone | red. |
| 9 | ----do---- | urea of 1-phenyl-(4'-phenyl-3':2''-dimethyl-4''-amino)-3-methyl-5-pyrazolone | red. |
| 10 | ----do---- | thiourea of 1-(4'-amino-3'-methylphenyl)-3-methyl-5-pyrazolone | red. |
| 11 | ----do---- | thiourea of 1-(4'-amino-2'-chlorophenyl)-3-methyl-5-pyrazolone | red. |
| 12 | ----do---- | thiourea of 1-(4'-aminophenyl)-3-phenyl-5-pyrazolone | red. |
| 13 | ----do---- | thiourea of 1-phenyl-(4'-phenyl-4''-amino)-3-methyl-5-pyrazolone | red. |

What I claim is:

1. A process for the manufacture of a metallisable monoazo dyestuff which, in the free state, corresponds to the formula

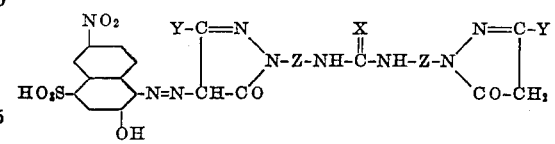

which comprises coupling 1 mole of 1-diazo-6-nitro - 2 - hydroxy - naphthalene-4-sulfonic acid with 1 mole of a pyrazolone-urea of the formula

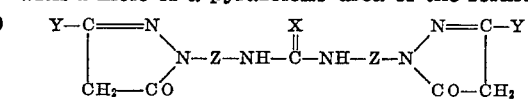

in which formulae X stands for a metalloid of the 6th group of periodic table whose atomic weight is not less than 16 and not greater than 33, Y stands for a radical selected from the group consisting of methyl, ethyl and phenyl radicals, and Z stands for a member selected from the group consisting of p-phenylene and 4:4'-diphenylene radicals free from sulfonic acid groups.

2. A process for the manufacture of a metallisable monoazo dyestuff which, in the free state, corresponds to the formula

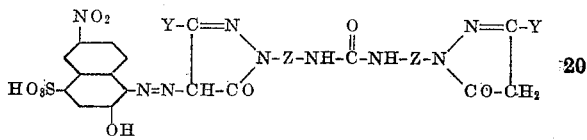

which comprises coupling 1 mole of 1-diazo-6-nitro-2-hydroxynaphthalene-4-sulfonic acid with 1 mole of a pyrazolone-urea of the formula

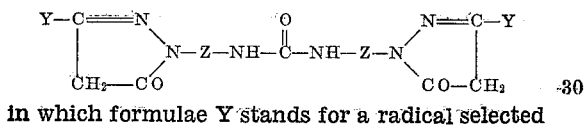

in which formulae Y stands for a radical selected from the group consisting of methyl, ethyl and phenyl radicals, and Z stands for a member selected from the group consisting of p-phenylene and 4:4'-diphenylene radicals free from sulfonic acid groups.

3. A process for the manufacture of a metallisable monoazo dyestuff which, in the free state, corresponds to the formula

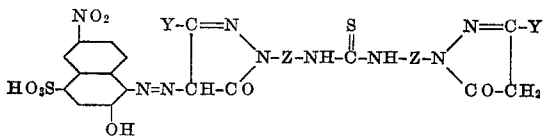

which comprises coupling 1 mole of 1-diazo-6-nitro-2-hydroxynaphthalene-4-sulfonic acid with 1 mole of a pyrazolone-thio urea of the formula

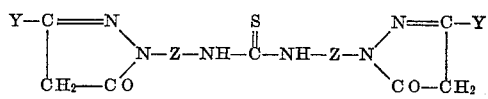

in which formulae Y stands for a radical selected from the group consisting of methyl, ethyl and phenyl radicals, and Z stands for a member selected from the group consisting of p-phenylene and 4:4'-diphenylene radicals free from sulfonic acid groups.

4. Process for the manufacture of a metallisable monoazo dyestuff which, in the free state, corresponds to the formula

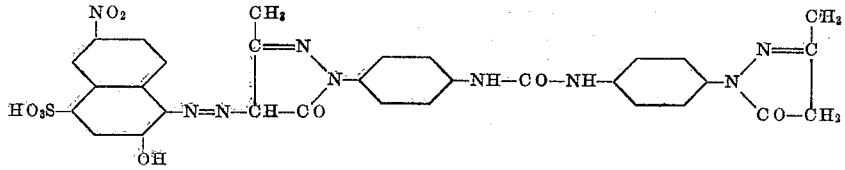

which comprises coupling 1 mole of 1-diazo-6-nitro-2-hydroxynaphthalene-4-sulfonic acid with 1 mole of the pyrazolone-urea of the formula

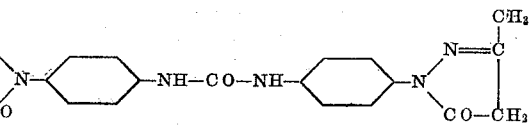

5. Process for the manufacture of a metallisable monoazo dyestuff which, in the free state, corresponds to the formula

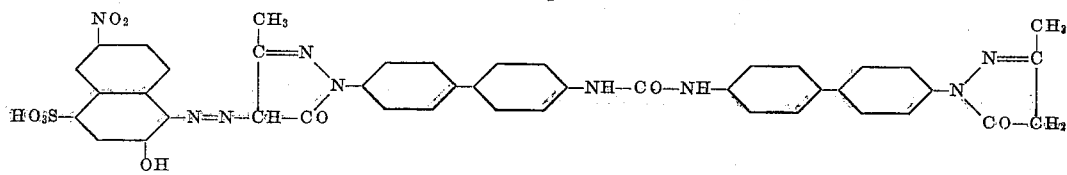

which comprises coupling 1 mole of 1-diazo-6-nitro-2-hydroxynaphthalene-4-sulfonic acid with 1 mole of the pyrazolone-urea of the formula

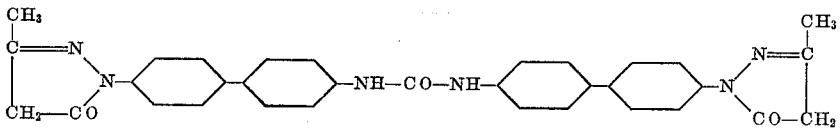

6. Process for the manufacture of a metallisable monoazo dyestuff which, in the free state, corresponds to the formula

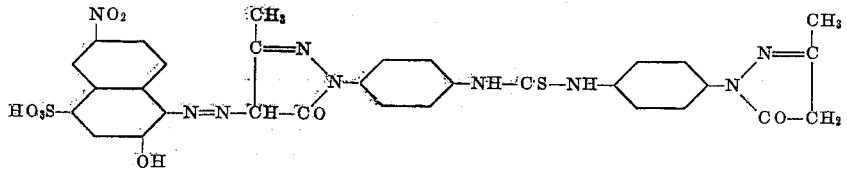

which comprises coupling 1 mole of 1-diazo-6-nitro-2-hydroxynaphthalene-4-sulfonic acid with 1 mole of the pyrazolone-thio urea of the formula

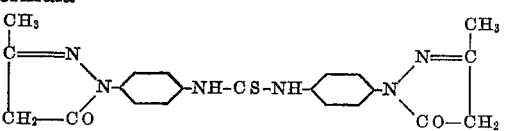

7. A metallisable monoazo dyestuff which, in the free state, corresponds to the formula

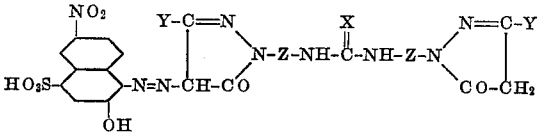

wherein X stands for a metalloid of the 6th group of periodic table whose atomic weight is not less than 16 and not greater than 33, Y stands for a radical selected from the group consisting of methyl, ethyl and phenyl radicals, and Z stands for a member selected from the group consisting of p-phenylene and 4:4'-diphenylene radicals free from sulfonic acid groups.

8. A metallisable monoazo dyestuff which, in the free state, corresponds to the formula

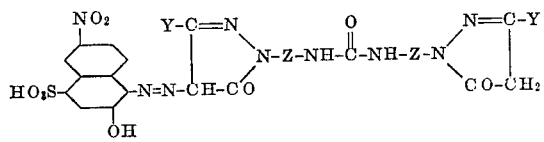

wherein Y stands for a radical selected from the group consisting of methyl, ethyl and phenyl radicals, and Z stands for a member selected from the group consisting of p-phenylene and 4:4'-diphenylene radicals free from sulfonic acid groups.

9. A metallisable monoazo dyestuff which, in the free state, corresponds to the formula

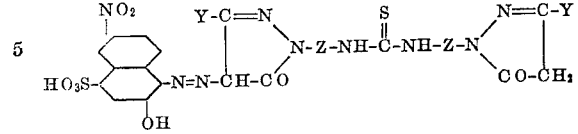

wherein Y stands for a radical selected from the group consisting of methyl, ethyl and phenyl radicals, and Z stands for a member selected from the group consisting of p-phenylene and 4:4'-diphenylene radicals free from sulfonic acid groups.

10. The metallisable monoazo dyestuff which, in the free state, corresponds to the formula

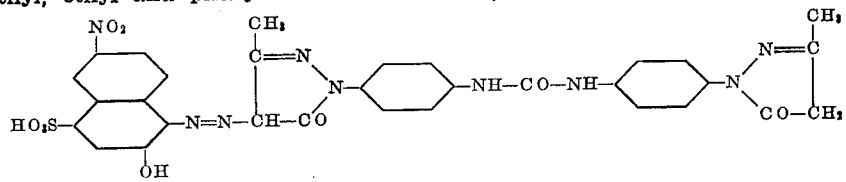

11. The metallisable monoazo dyestuff which, in the free state, corresponds to the formula

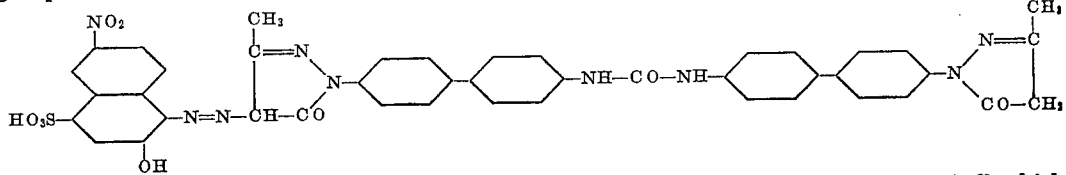

12. The metallisable monoazo dyestuff which, in the free state, corresponds to the formula

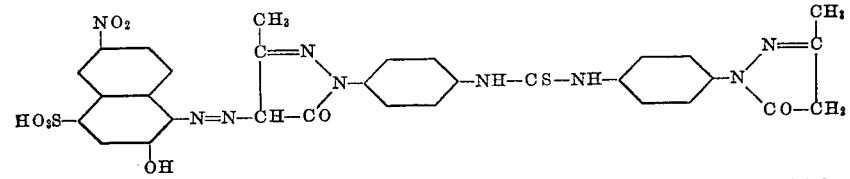

PETER HINDERMANN.

REFERENCES CITED

The following references are of record in the file of this patent:

UNITED STATES PATENTS

| Number | Name | Date |
|---|---|---|
| 1,845,426 | Latten | Feb. 16, 1932 |
| 2,185,901 | Schmid | Jan. 2, 1940 |
| 2,195,784 | Schmid | Apr. 2, 1940 |
| 2,195,787 | Schmid | Apr. 2, 1940 |
| 2,195,788 | Schmid | Apr. 2, 1940 |
| 2,221,360 | Schmid | Nov. 12, 1940 |
| 2,221,361 | Schmid | Nov. 12, 1940 |
| 2,228,374 | Stusser et al. | Jan. 14, 1941 |